United States Patent
Strolle

(10) Patent No.: US 7,113,539 B1
(45) Date of Patent: Sep. 26, 2006

(54) METHOD AND APPARATUS FOR PERFORMING BANDEDGE EQUALIZATION

(75) Inventor: Christopher Hugh Strolle, Glenside, PA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 08/869,589

(22) Filed: Jun. 5, 1997

Related U.S. Application Data

(60) Provisional application No. 60/019,308, filed on Jun. 7, 1996.

(51) Int. Cl.
   *H03H 7/30* (2006.01)
(52) U.S. Cl. ..................................... 375/229
(58) Field of Classification Search ................ 375/229, 375/326, 235; 708/323
   See application file for complete search history.

(56) References Cited

U.S. PATENT DOCUMENTS

| | | | |
|---|---|---|---|
| 4,253,184 A * | 2/1981 | Gitlin et al. ................. | 375/232 |
| 4,466,134 A | 8/1984 | McNicol ..................... | 455/311 |
| 4,831,637 A | 5/1989 | Lawrence et al. .......... | 375/118 |
| 4,891,716 A * | 1/1990 | Andersen ..................... | 360/31 |
| 4,969,163 A * | 11/1990 | Ungerboeck ................ | 375/234 |
| 5,065,410 A | 11/1991 | Yoshida et al. .............. | 375/98 |
| 5,067,137 A * | 11/1991 | Kaneko ...................... | 375/232 |
| 5,588,025 A | 12/1996 | Strolle et al. ............... | 375/316 |
| 5,793,821 A * | 8/1998 | Norrell et al. .............. | 375/355 |
| 5,872,815 A * | 2/1999 | Strolle et al. ............... | 375/326 |
| 5,881,108 A * | 3/1999 | Herzberg et al. ........... | 375/296 |

* cited by examiner

*Primary Examiner*—Kevin Burd
(74) *Attorney, Agent, or Firm*—Lowenstein Sandler PC

(57) ABSTRACT

A method and apparatus for performing bandedge equalization. Specifically, the apparatus contains a pre-equalizer for adjusting the amplitudes of the bandedges of a broadband signal in response to a control signal. A bandedge filter is connected to the pre-equalizer and extracts a bandedge signal from the broadband signal. Lastly, a bandedge signal processor that is connected to the bandedge filter generates the control signal in response to said bandedge signal. In this manner, when the bandedges of the broadband signal are asymmetric, the apparatus adjusts the signal strength of each bandedge with respect to one another to equalize (balance) the bandedges. The balanced signal can then be used by a bandedge timing recovery circuit. As such, the accuracy of a bandedge timing recovery circuit is not impacted by the asymmetric bandedges of the input signal.

9 Claims, 2 Drawing Sheets

METHOD AND APPARATUS FOR PERFORMING BANDEDGE EQUALIZATION

CROSS-REFERENCE TO RELATED APPLICATION

This non-provisional U.S. national application, filed under 35 U.S.C. §111(a) claims, under 35 U.S.C. §119(e)(1), the benefit if the filing date of provisional U.S. application No. 60/019,308, filed under 35 U.S.C. §111(b) on Jun. 7, 1996.

FIELD OF THE INVENTION

The invention relates to digital information transmission systems. More particularly, the invention relates to improved timing recovery circuitry in digital information transmission systems that employ bandedge timing recovery.

BACKGROUND OF THE DISCLOSURE

A conventional digital information transmission system contains a data source, a transmitter, a transmission medium, and a receiver. Illustratively, in a digital television system, the data source is a digitized audio-video signal, the transmitter contains a plurality of application encoders (e.g., a video signal encoder, an audio signal encoder, and a system control information encoder), a transport encoder for packetizing and multiplexing the encoded signals and an M-ary quadrature amplitude modulation (QAM) modulator. The transmission medium is typically a cable network or wireless path.

The receiver in a digital television system contains a demodulator for demodulating the QAM signal, a transport decoder for depacketizing and demultiplexing the encoded signals, a plurality of application decoders, and a presentation device for displaying the information from the data source to a user, e.g., the presentation device can be a conventional television. The demodulator produces a serial baseband digital signal (a bit stream containing packetized and multiplexed digital information). As is well-known in the art, the demodulator accomplishes carrier recovery, signal equalization, packet synchronization and the like, to generate a useful baseband digital signal. The baseband signal must be further processed by a transport decoder to extract from the baseband signal the video, audio and timing information within the data packets.

In a digital information transmission system employing bandedge timing recovery, an imbalance in the amplitudes of the upper and lower bandedge signal strength causes "stress" or jitter in the timing recovery circuitry. To produce jitter-free timing signals, such timing recovery circuitry rely on constant or near constant signal strength at both bandedges. If the incoming signal becomes attenuated, in some cases a 10 db difference between upper and lower bandedge signal strength can occur for broadband signals, timing signals are no longer produced in a jitter-free manner and the demodulator may be "thrown out of sync" with the rest of the system resulting in a degraded or non-existent baseband signal.

For example, in wireless communication systems, as the carrier frequency increases, the impact of multipath attenuation becomes more pronounced. Traditional equalizers in these types of systems can easily compensate for multipath attenuation by employing some standard form of closed end cancellation to eliminate the reflected signal that causes the incident signal attenuation. However, for broadband signals, a conventional equalizer does not compensate for different attenuation at each bandedge, e.g., an imbalanced bandedge signal strength. Consequently, the timing loop becomes "stressed" when the imbalanced signals are received. This results in jitter or unevenly spaced intervals of the timing signals. Properly spaced timing signals are critical to the optimal operation of the receiver.

Therefore, a need exists in the art for a method and apparatus that can autobalance the amplitudes of the bandedges of the incoming signal to reduce timing signal jitter caused by an imbalance in amplitudes of the upper and low bandedge signals.

SUMMARY OF THE INVENTION

The disadvantages heretofore associated with the prior art are overcome by the present invention of a method and apparatus for performing bandedge equalization. Specifically, the apparatus contains a pre-equalizer for adjusting the amplitudes of the bandedges of a broadband signal in response to a control signal. A bandedge filter is connected to the pre-equalizer and extracts a bandedge signal from the broadband signal. Lastly, a bandedge signal processor that is connected to the bandedge filter generates the control signal in response to said bandedge signal. In this manner, when the bandedges of the broadband signal are asymmetric, the apparatus adjusts the signal strength of each bandedge with respect to one another to equalize (balance) the bandedges. The balanced signal can then be used by a bandedge timing recovery circuit. As such, the accuracy of a bandedge timing recovery circuit is not impacted by the asymmetric bandedges of the input signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
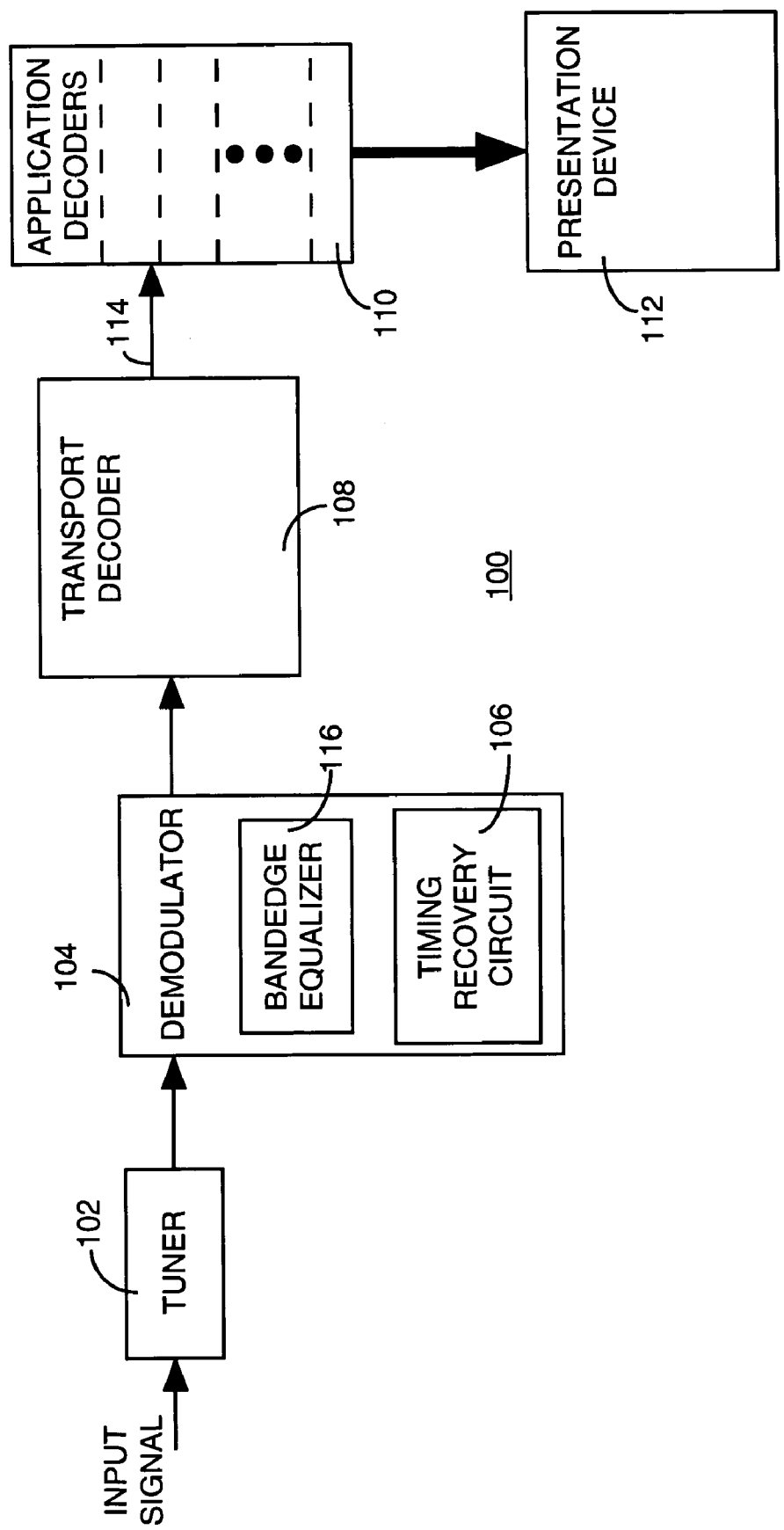
FIG. 1 shows a high level block diagram of a receiver in accordance with the invention.

FIG. 1 depicts a high level block diagram of a receiver 100 in accordance with the teachings of the present invention. The receiver shall be described in the context of a conventional digital television application. However, from the following disclosure, those skilled in the art will understand that this form of inventive receiver can be used in any digital data transmission system that uses a bandedge timing recovery technique.

The receiver 100 contains a tuner 102, a demodulator 104, a transport decoder 108, one or more application decoders 110, and one or more presentation devices 112. Typically, the tuner 102 (also known as an RF/IF front end), located prior to the demodulator 104 and connected thereto, selects one channel of information for receipt from multiple available channels carried by a transmission medium such as a cable network or wireless transmission system.

The input signal to the demodulator 104 is a modulated analog signal, e.g., an M-ary QAM signal (where M is typically 16, but can be 32, 64, 256 and the like), centered at a low intermediate frequency (IF), e.g., a 5 MHZ IF having a 6 MHZ bandwidth. Although discussed in relation to a QAM signal, those skilled in the art will understand that the invention can be utilized with any other form of modulation, e.g., vestigial sideband (VSB), offset QAM (OQAM) and the like. The demodulator 104 demodulates the input signal to generate a digital bit stream represented by a series of signal samples, where each sample is a byte of digital data representing a sample of a channel symbol. This digital data contains encoded and compressed audio and video signals and system control information. To facilitate accurate input signal sampling, the demodulator contains the bandedge equalizer 116 of the present invention as well as a conventional bandedge timing recovery circuit 106 for producing substantially jitter-free timing signals. There are many such bandedge timing recovery techniques available in the art, all of which will be improved using the bandedge equalizer of the present invention.

The demodulated signal is then sent to the transport decoder 108 wherein a transport timing synchronization signal is generated from the transmitter timing information contained in the bit stream. The transport decoder 108 depacketizes and demultiplexes the data packets as well as decodes appropriate system control information. The data from the packets is transferred to an appropriate application decoder 110, e.g., video data is sent to an MPEG video decoder, audio data is sent to an MPEG audio decoder, and system control information is sent to one or more control signal decoders. The applications ultimately produce information that is presented to a user on a presentation device 112 such as a conventional television, computer terminal, and the like.

Figure 2:
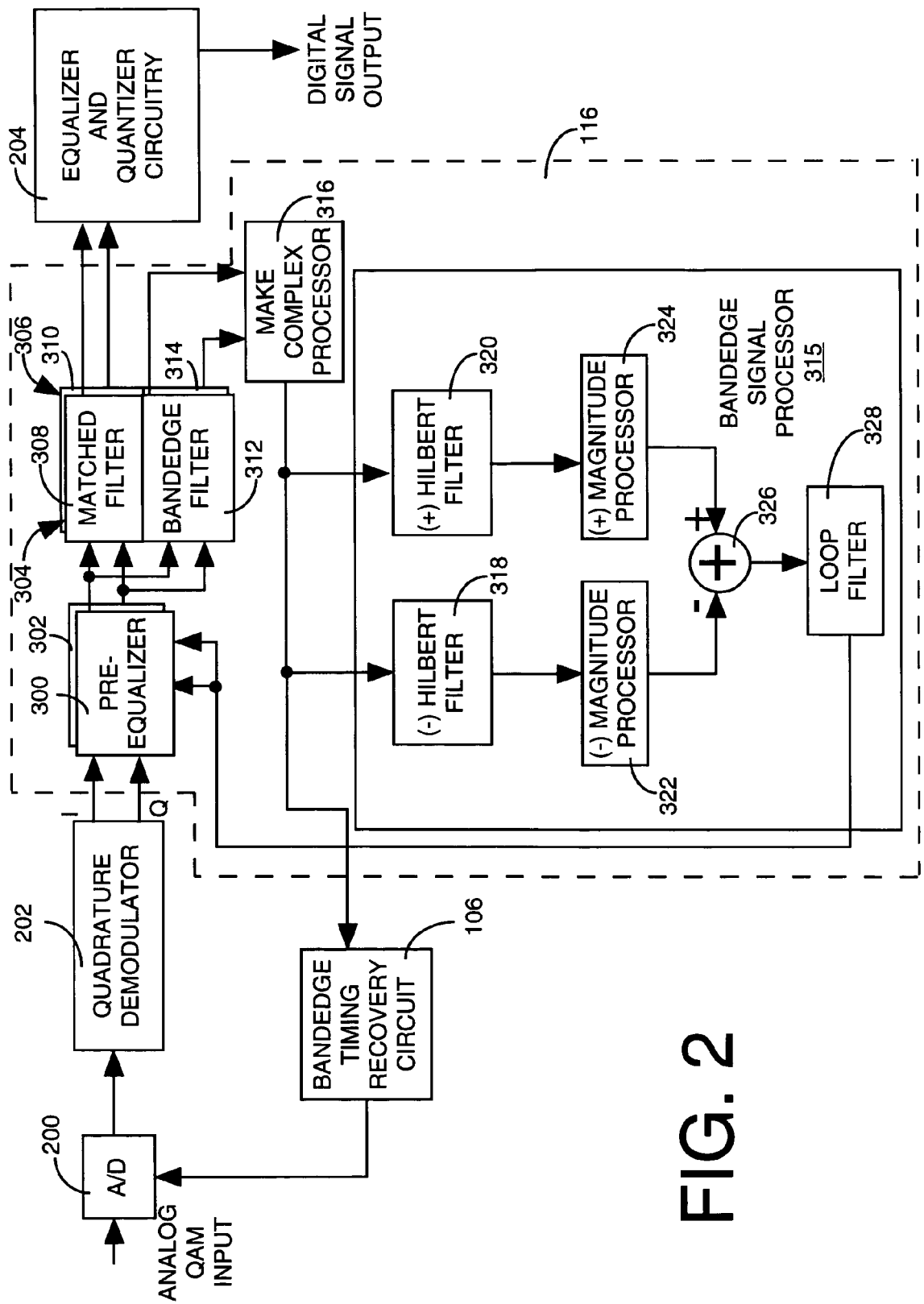
FIG. 2 shows a detailed block diagram of the bandedge equalizer of the present invention.

FIG. 2 depicts a detailed block diagram of the demodulator 104 containing the bandedge equalizer 116 of the present invention. The inventive bandedge equalizer corrects amplitude differences in the upper and lower bandedge signal strength. As such, the bandedge timing recovery circuit 106 is not affected by a bandedge amplitude imbalance.

As the QAM signal is analog, the received QAM signal is first sampled by an (A/D) converter 200 which converts the input signal into a digital data stream. Optimal sample timing for the A/D converter is provided by the bandedge timing recovery circuit 106. Within this data stream are digitized samples of information containing audio, video and system control. If the incoming signal had suffered some level of asymmetric attenuation during transmission, any or all of these signals may have been altered. Since system control signals contain important system timing information, the receiver's ability to process the output signal may be compromised as a result of the signal attenuation.

Following the A/D converter 200, the demodulator further contains a quadrature demodulator, 202, the bandedge equalizer 116, and a conventional equalizer and quantizer circuit 204. The quadrature demodulator 204 produces an in-phase (I) and quadrature phase (Q) signal components from the sampled input signal. The I and Q components are bandedge equalized (balanced) by the bandedge equalizer 116 to ensure that both bandedges of the I and Q components have substantially equal amplitude. The bandedge equalized signal is then conventionally equalized to suppress intersymbol interference and quantized to produce a digital symbol stream. The bandedge equalization ensures that a bandedge timing recovery technique operates properly, i.e., substantially jitter-free.

More specifically, bandedge equalization is accomplished by passing the I and Q component signal through respective pre-equalizers 300 and 302 and then through respective matched filter/complements 304 and 306. Each matched filter/complement contains two filters: conventional matched filters 308 and 310 that are matched to the input symbol shape and a bandedge filter 312 and 314. Each bandedge filter 312 and 314 has a bandwidth profile that positions a bandedge slope of the filter centrally at both the high and low bandedges of the input signal bandwidth (e.g., at approximately 2 and 8 MHz for a digital television signal). Furthermore, the frequency response of the bandedge filter has a bandedge slope that is the complement of the slope of the input signal bandedge slope, i.e., the bandedge filter is the compliment of the matched filter. As such, the bandedge filters 312 and 314 produce a double sideband, amplitude modulated signal containing symbol timing information. This bandedge filtered signal, having both I and Q components, is used by a conventional bandedge timing recovery circuit. The bandedge filtered signal is also used by the bandedge equalizer 116 to compensate for any imbalance in the bandedge signal amplitudes.

The output signal of the bandedge filters 312 and 314 is then applied to a "make complex" processor 316 that combines the I and Q components to form a complex signal. The complex signal is further processed by a bandedge signal processor 315. This processor contains a pair of Hilbert filters 318 and 320, a pair of magnitude processors 322 and 324, a subtractor 326 and a loop filter 328. The complex signal is then filtered by two Hilbert filters 318 and 320 which extract the negative and positive bandedge components respectively from the complex signal. The Hilbert filters can be simple three-tap filters, since the bandedge signals are narrowband and three tap filters are very effective in separating the positive and negative components of narrowband signals. In the complex domain, the (−) Hilbert filter has characteristic $$\begin{bmatrix} 0 & 1 & 0 \\ -.5 & 0 & .5 \end{bmatrix}$$

and the (+) Hilbert filter has characteristic $$\begin{bmatrix} 0 & 1 & 0 \\ .5 & 0 & -.5 \end{bmatrix}.$$

These matrices eliminate undesirable signal components and produce the bandedge signals. After filtering, the negative and positive components are then passed through negative and positive magnitude processors 322 and 324 which determine the instantaneous magnitudes of the negative and positive bandedge signals. These signals form a minuend and subtrahend for a subtractor 326. Specifically, the negative bandedge magnitude signal forms the subtrahend and the positive bandedge magnitude signal forms the minuend. The difference value produced by the subtractor is a preliminary adjusting factor ω which represents the difference in magnitudes between the upper and lower bandedge signal strengths. The preliminary adjusting factor ω forms the input to the loop filter 328 (a low pass filter). The output of the loop filter 328 is the final adjusting factor α. The final adjusting factor α is applied to the pre-equalizers 300 and 302 to balance the I and Q components of the incoming demodulated signal which is then processed by the remaining receiver circuitry. The pre-equalizer has the following characteristic $$\begin{bmatrix} 0 & 1 & 0 \\ \alpha & 0 & -\alpha \end{bmatrix},$$

where $-0.5<\alpha<0.5$.

As such, if the upper bandedge frequency has a larger amplitude than the lower bandedge frequency, the pre-equalizer attenuates the lower bandedge frequency signal by an amount ($\alpha$) that is proportional to the signal difference ($\omega$). If the converse occurs, i.e., lower bandedge signal larger than the upper bandedge signal, then the pre-equalizer attenuates the lower bandedge signal. As a result, the bandedge signals used by a downstream bandedge timing recovery technique have substantially equal amplitudes. Consequently, the timing recovery is not impacted by a bandedge imbalance at the input of the receiver.

The foregoing description of the pre-equalizer attenuated the imbalanced signals to achieve balance, however, amplifying the bandedge with the lower signal strength would function just well to achieve balanced bandedge signals.

Although various embodiments which incorporate the teachings of the present invention have been shown and described in detail herein, those skilled in the art can readily devise many other varied embodiments that still incorporate these teachings.

What is claimed is:

1. Apparatus for equalizing the amplitudes of the bandedges of a broadband signal comprising:
   a pre-equalizer for adjusting the amplitudes of the bandedges of said broadband signal in response to a control signal;
   a bandedge filter, connected to said pre-equalizer, for extracting a bandedge signal from said broadband signal; and
   a bandedge signal processor, connected to said bandedge filter, for generating said control signal in response to said bandedge signal, wherein said bandedge signal processor comprises:
      a first filter for producing a first bandedge signal from said bandedge signal;
      a second filter for producing a second bandedge signal from said bandedge signal;
      a first magnitude processor, connected to said first filter, for generating a first magnitude value representing the magnitude of said first bandedge signal; and
      a second magnitude processor, connected to said second filter, for generating a second magnitude value representing the magnitude of said second bandedge signal.

2. The apparatus of claim 1 wherein said bandedge signal processor further comprises:
   a subtractor, connected to said first and second magnitude processors, for producing a difference value representing the difference between said first and second magnitude values; and
   a loop filter, connected to said subtractor, for generating said control signal from said difference value.

3. The apparatus of claim 1 wherein said first filter is a first Hilbert filter.

4. The apparatus of claim 1 wherein said second filter is a second Hilbert filter.

5. The apparatus of claim 4 wherein said first Hilbert filter has a form $$\begin{bmatrix} 0 & 1 & 0 \\ -.5 & 0 & .5 \end{bmatrix}.$$

6. The apparatus of claim 4 wherein said second Hilbert filter has a form $$\begin{bmatrix} 0 & 1 & 0 \\ .5 & 0 & -.5 \end{bmatrix}.$$

7. Apparatus for equalizing the amplitudes of the bandedges of a broadband signal comprising:
   a pre-equalizer for adjusting the amplitudes of the bandedges of said broadband signal in response to a control signal;
   a bandedge filter, connected to said pre-equalizer, for extracting a bandedge signal from said broadband signal;
   a first Hilbert filter connected to said bandedge filter for producing a first bandedge signal from said bandedge signal;
   a second Hilbert filter connected to said bandedge filter for producing a second bandedge signal from said bandedge signal;
   a first magnitude processor, connected to said first Hilbert filter, for generating a first magnitude value representing the magnitude of said first bandedge signal; and
   a second magnitude processor, connected to said second Hilbert filter, for generating a second magnitude value representing the magnitude of said second bandedge signal
   a subtractor, connected to said first and second magnitude processors, for producing a difference value representing the difference between said first and second magnitude values; and
   a loop filter, connected to said subtractor, for generating said control signal from said difference value.

8. A method of equalizing the amplitudes of the bandedges of a broadband signal comprising the steps of:
   adjusting the amplitudes of the bandedges of said broadband signal in response to a control signal;
   extracting a bandedge signal from said broadband signal; and
   generating said control signal in response to said bandedge signal, wherein said generating step further comprises the steps of:
      producing a first bandedge signal from said bandedge signal;
      producing a second bandedge signal from said bandedge signal;
      generating a first magnitude value representing a magnitude of said first bandedge signal; and
      generating a second magnitude value representing a magnitude of said second bandedge signal.

9. The method of claim 8 wherein said control signal generating step further comprises the steps of:
   producing a difference value representing the difference between said first and second magnitude values; and
   generating said control signal from said difference value.

* * * * *